Feb. 20, 1968   G. H. SCHWALM   3,369,434
WIRE FEED AND CUTOFF
Filed Jan. 28, 1966   6 Sheets-Sheet 2
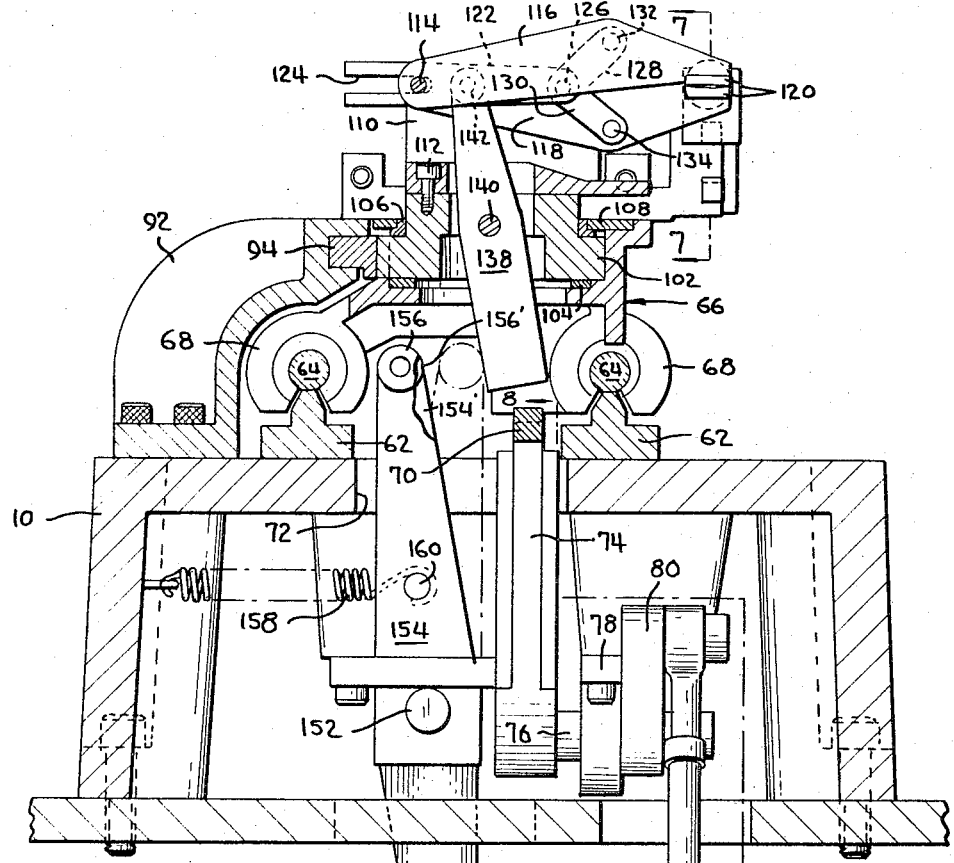
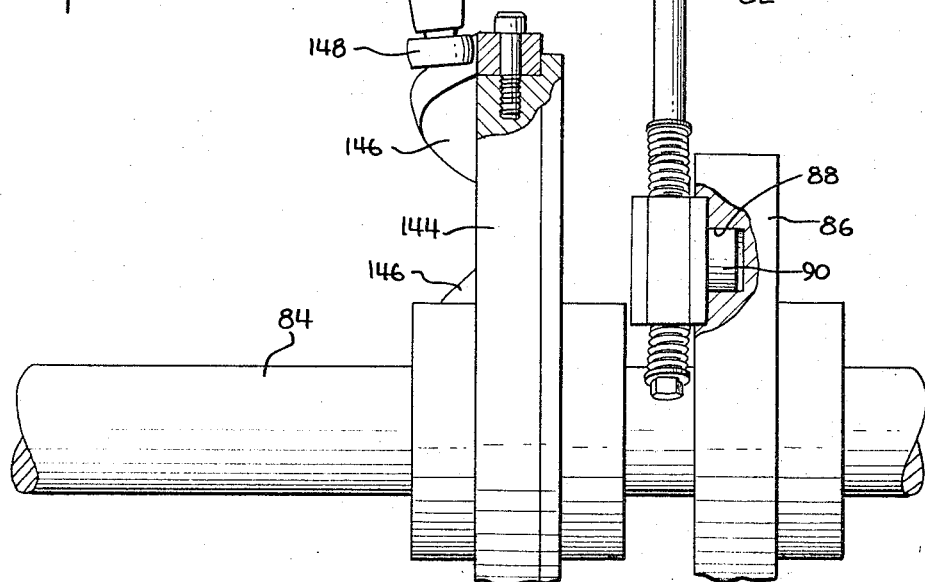
Fig. 2

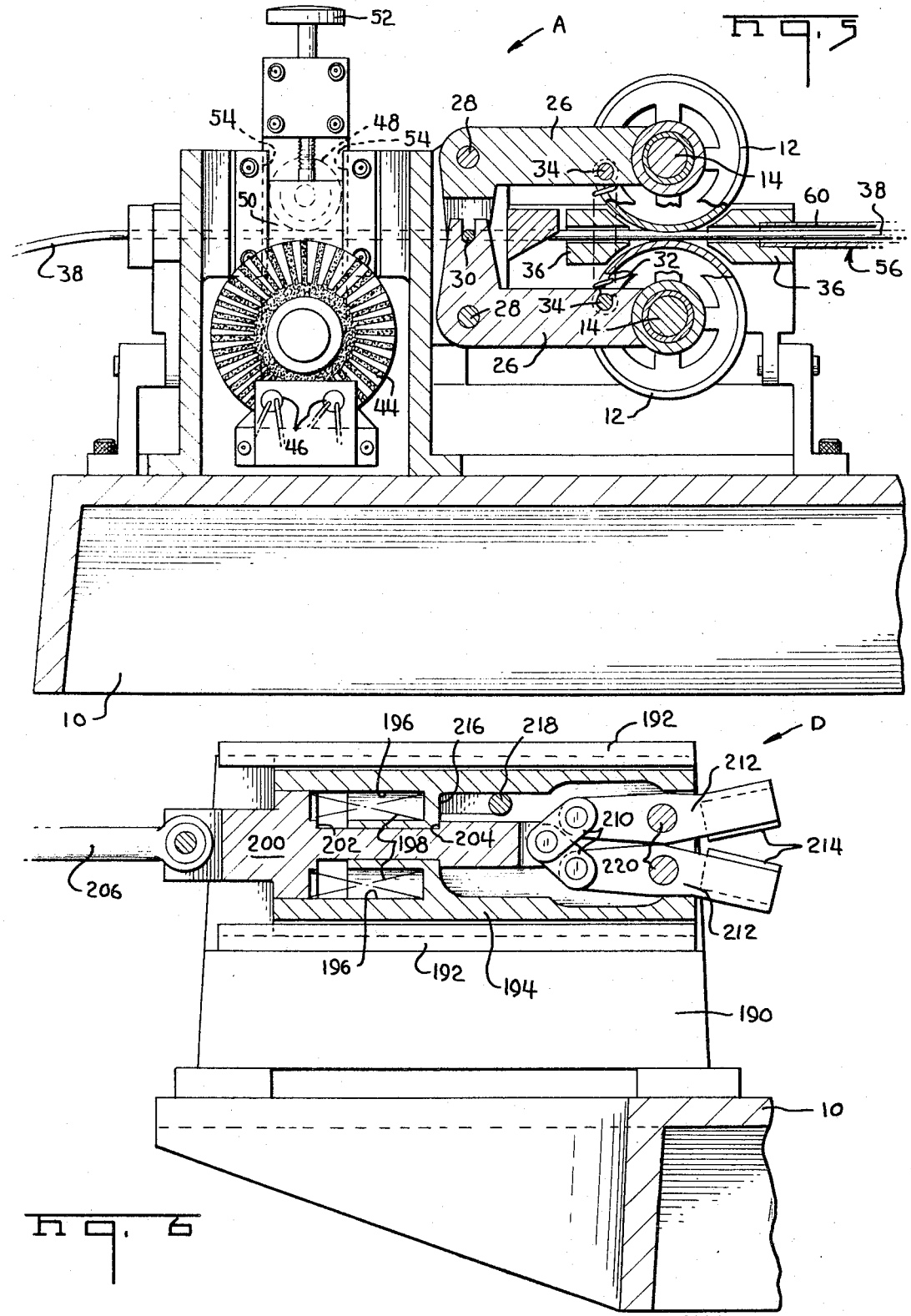

United States Patent Office 3,369,434
Patented Feb. 20, 1968

3,369,434
WIRE FEED AND CUTOFF
Glendon Henry Schwalm, Harrisburg, Pa., assignor to AMP Incorporated, Harrisburg, Pa.
Filed Jan. 28, 1966, Ser. No. 523,656
11 Claims. (Cl. 83—17)

ABSTRACT OF THE DISCLOSURE

A material handling apparatus and method are provided for loading a predetermined length of wire onto a conveyor. The wire is fed in a first direction and turned to form a U-shaped configuration whereby both ends of the wire are facing the same direction which is opposite to the direction in which the wire was fed.

---

The invention is herein disclosed in conjunction with an automatic lead-making machine of the type described in the U.S. patent to Andren No. 3,201,848. In the description which follows reference will frequently be made to the Andren patent for details of the Andren lead-making machine and that machine will be shown and described in the following specification only to the extent necessary for an understanding of the instant invention. It will be understood that where reference is made to the Andren patent, Patent No. 3,201,848 is intended. It will also be understood that the improved wire-loading apparatus and method of the instant invention can be used in other lead-making machines or similar devices having a conveyor for long filamentary articles which operate on principles similar to that of the Andren device.

The Andren patent discloses a lead-making machine comprising a conveyor having a plurality of gripping devices thereon. The ends of the individual leads are held in these gripping devices and presented to insulation stripping and terminal crimping mechanisms stationed beside the conveyor. It is extremely desirable for the lead to be held by the gripping devices in a manner whereby the ends of the lead will be extending in the same direction, that is both ends will be facing the same side of the conveyor. With this arrangement the subsequent stripping devices and crimping devices can all be positioned on one side of the conveyor thereby simplifying the driving arrangements and resulting in overall economy due both to simplified machinery and the utilization of less overall floor space in the lead-making plan.

The principal object of this invention is therefore to provide a loading means and method which improves over those shown in the Andren patent.

A further object is to provide a loading device and method which will allow a wide range of lead lengths to be loaded into the conveyor of a lead-making machine.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purpose of illustration in order that others skilled in the art may fully understand the invention and the principles thereof and the manner of applying it in practical use so that they may modify it in various forms, each as may be best suited to the conditions of a particular use.

In the drawings, in which like reference numerals refer to like parts:

FIGURE 2 is a view partly in section of the wire lead end handling means taken along the line 2—2 of FIGURE 1;

FIGURE 5 is a cross-sectional view of the wire feed mechanism taken along the line 5—5 of FIGURE 1;

FIGURE 6 is a cross-sectional view of the wire severing means taken along the line 6—6 of FIGURE 1;

Figure 1:
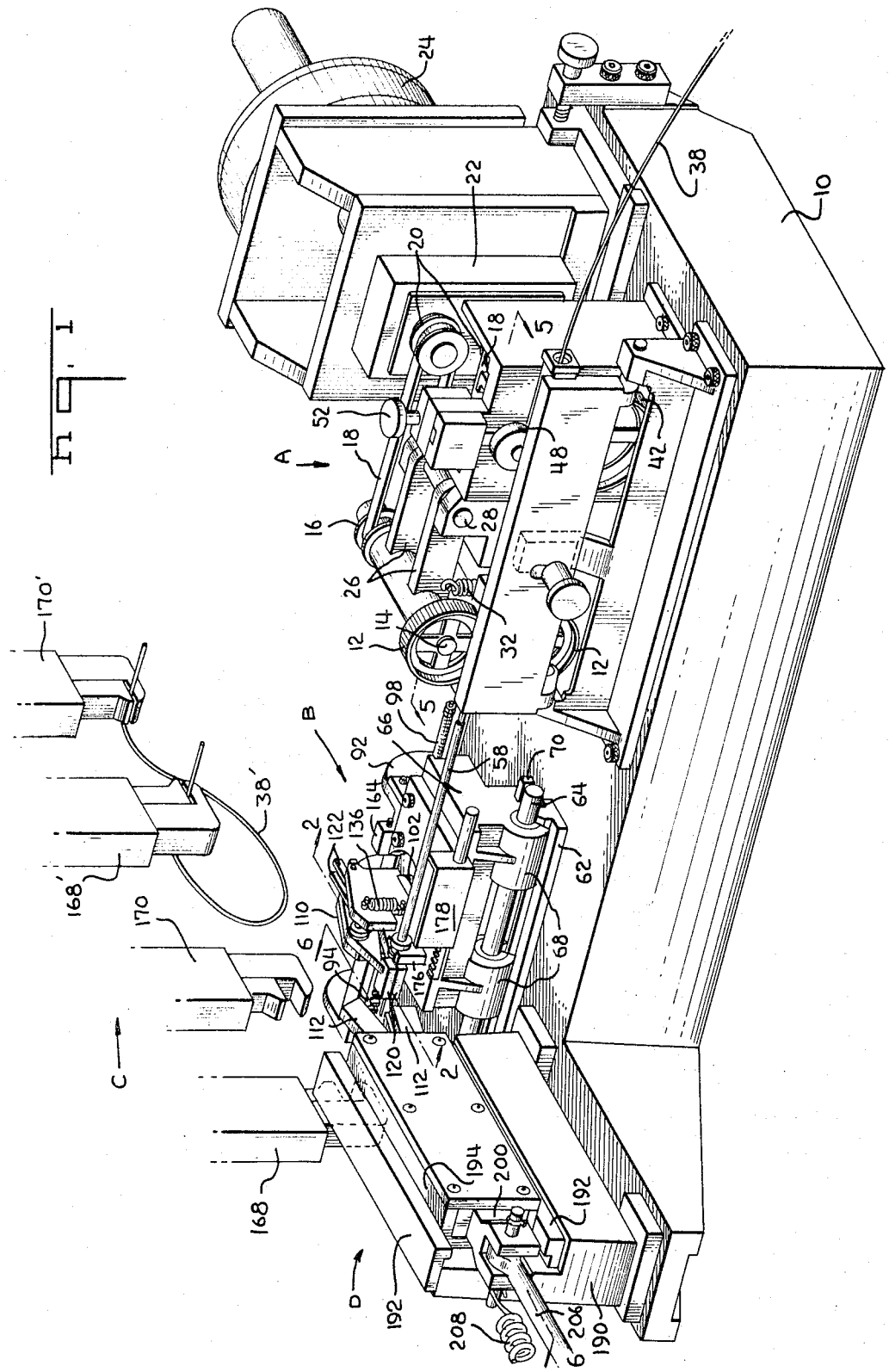
FIGURE 1 is an overall perspective view of the device made in accordance with the teachings of the present invention.

With reference to FIGURE 1 there is shown generally a feeding assembly A which feeds wire from a substantially endless source, a lead end handling and turning assembly B which receives the wire as it is fed from assembly A, a plurality of gripping jaws C which are carried by an intermittently operable conveyor, and a wire cutoff assembly D which severs the wire into predetermined lengths.

The feeding assembly A will now be described in detail. The assembly is mounted on a base 10 which forms a part of a lead-making machine such as shown in the Andren patent. As best seen in FIGURES 1 and 5 the feeding assembly comprises a pair of feed wheels 12 disposed above and below the feed path of the wire. The wheels 12 are carried on a pair of shafts 14 having pulleys 16 affixed to the end thereof. A pair of belts 18 engage the pulleys 16 and a second pair of pulleys 20, the pulleys 20 being secured to a pair of shafts extending from a suitable transmission 22 driven by an electric motor 24 or other suitable driving means. The shafts 14 are mounted in bearings carried by a pair of arms 26, the arms 26 being pinned to the frame at 28 for permitting oscillating movement of the feed wheels to vary the distance therebetween. A pin and slot connection 30 is provided on the arms 26 for insuring equal rotative movement of the arms. A spring 32 extends between the arms and is secured thereto by means of pins 34, the said springs serving to bias the wheels 12 toward each other and therefore into firm engagement with the wire extending therebetween. Suitable guiding structure 36 is provided in the areas immediately preceding and following the feed wheels for guiding the wire 38 therethrough.

An idler shaft 40 is provided immediately preceding the feed wheels 12 and carries a friction wheel 42 adapted to contact and to be driven by the wire 38. Also carried by shaft 40 is a wheel 44 having regularly spaced dark and light areas thereon for cooperation with photoelectric cells 46. Movement of the wires 38 will cause rotation of wheel 42 and thus rotation of the counting wheel 44. The photo-electric cells 46 will emit counting pulses in accordance with the speed of rotation of wheel 44 and these pulses will energize a suitable counting mechanism not shown which will control the operation of motor 24 to thus control the length of wire fed by the feed wheels 12. For a full description of the method of operation of the wheel 44 and photo-electric cells 46 and one example of a motor control circuit associated therewith reference is made to copending application Serial No. 362,639 filed April 27, 1964, by Krienberg et al. and having a common assignee with the instant invention. A second friction wheel 48 is disposed opposite to wheel 42 and cooperates therewith to insure proper rotation of the wheel 42. Shaft 40 is carried on a suitable slide 50 which is movable by means of adjustment means 52 within ways 54 formed in the frame. By proper adjustment of the slide 50 and the shaft 40 the wheel 42 is caused to properly engage the moving wire 38. Suitable spring means may be employed for biasing the wheel 48 toward wheel 42 to further insure firm contact with the moving wire 38.

An elongated guide tube 56 extends from the feeding assembly A and comprises a pair of telescoping parts 58 and 60. The inner part 60 is secured to the guide 36 of the feeding assembly while the outer part 58 of the guide tube is capable of sliding movement toward and away from the feeding assembly.

Figure 8:
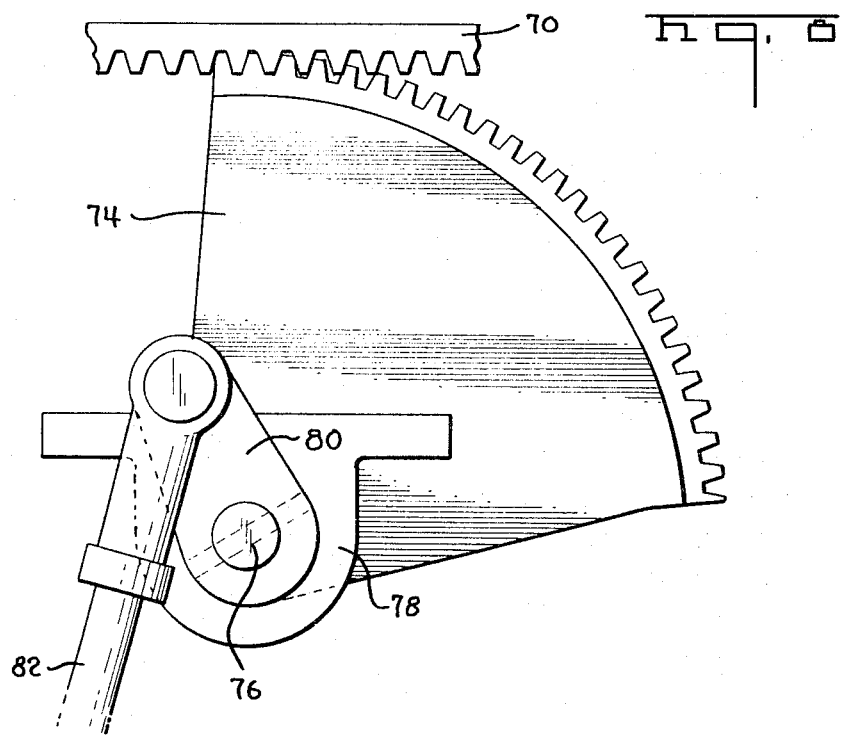
FIGURE 8 is a fragmentary view as seen in the direction of the arrows 8—8 of FIGURE 2.

The lead end handling and turning assembly B will now be described. With reference to the figures and in particular to FIGURE 2 there is provided a pair of longitudinally extending supports 62 secured to base 10 and having fixed thereto a pair of shafts 64. A main slide 66 is provided with bearing members 68 mounted for sliding movement upon the shafts 64. A rack 70 seen best in FIGURE 8 has downwardly extending teeth and is rigidly fixed to the slide 66. The base 10 is provided with an opening 72 through which extends a pinion sector 74 which engages the rack 70 to impart reciprocating movement to the slide 66. Pinion 74 is keyed to a stub shaft 76 carried by a suitable mounting bracket 78. Shaft 76 further has keyed thereto a crank 80 pivotally connected to a connecting rod 82. A cam shaft 84, FIGURE 2, is provided and carries a cam 86 thereon having a cam slot 88. A suitable cam follower 90 is secured to connecting rod 82 and rides in slot 88 whereby rotation of the cam 86 imparts motion to connecting rod 82 to thereby oscillate crank 80, which, through shaft 76, will impart oscillating motion to the pinion sector 74 and thus reciprocating motion to the slide 66 through rack 70.

Figure 3:
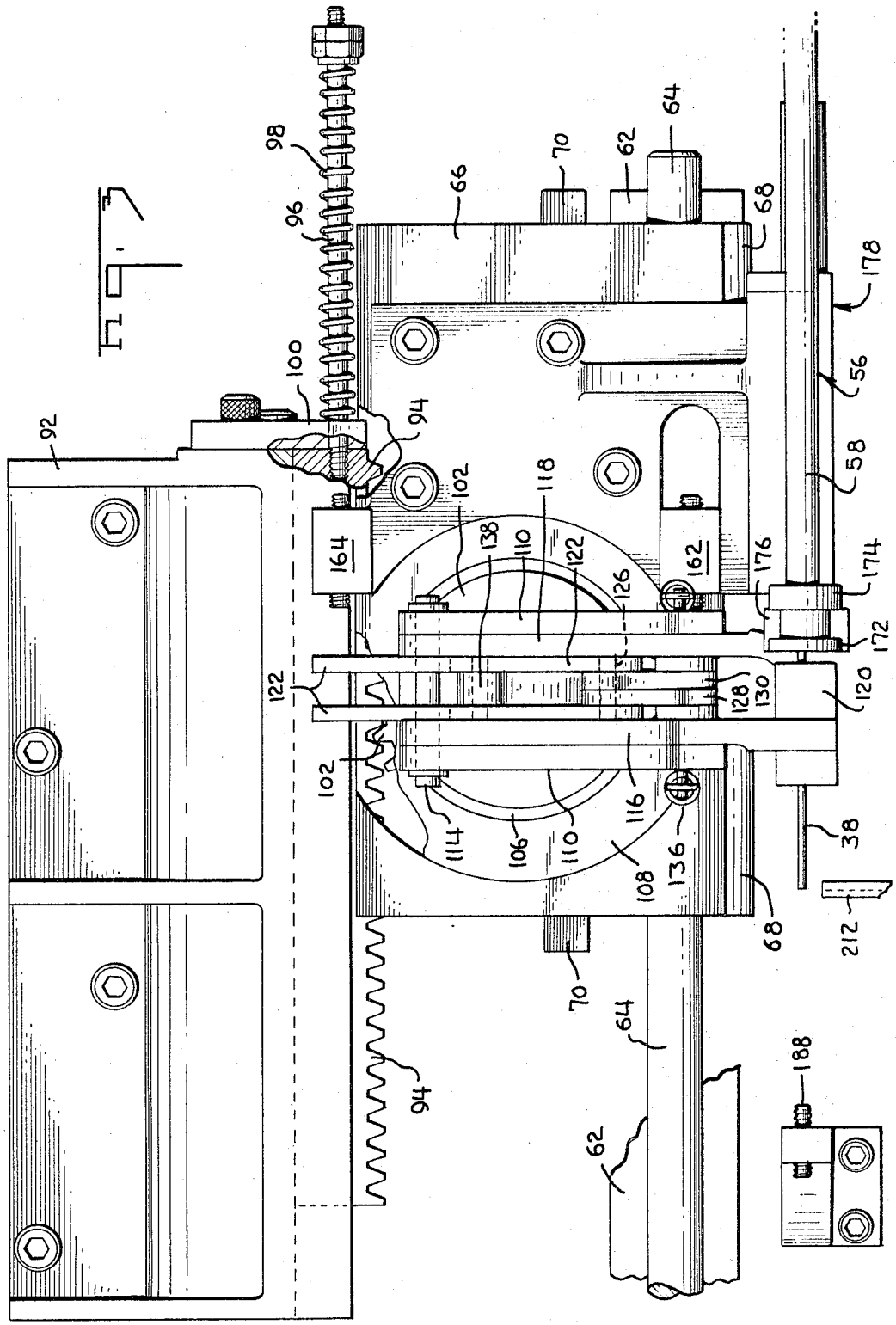
FIGURE 3 is a top plan view of the wire lead end handling device shown in its wire receiving position.

A suitable bracket 92 is secured to base 10 and carries a rack 94 best seen in FIGURE 3. Rack 94 is normally fixed relative to bracket 92 but is capable of limited relative motion thereto. A rod 96 carrying a relatively strong spring 98 is threaded into one end of the rack 94 and passes through a plate 100 secured to the bracket 92. Spring 98 normally maintains rack 94 into engagement with the plate 100 and thus in fixed position relative to bracket 92. However, compression of spring 98 will permit the rack to have slight leftward movement as seen in FIGURE 3 relative to bracket 92. This slight movement is for a purpose to be later described.

The main slide 66 rotatably carries the pinion 102, the pinion mounting comprising a thrust washer 104 disposed beneath the pinion, a suitable bearing 106, and a retainer 108 fixed to the slide and retaining the pinion in position. Pinion 102 meshes with the teeth of rack 94 whereby reciprocation of slide 66 causes rotation of pinion 102 as it rotates along the normally stationary rack 94.

Pinion 102 has a U-shaped member 110 secured thereto as by screws 112. Member 110 carries a pivot pin 114 for pivotally securing the upper and lower jaws 116 and 118, respectively of a wire lead end grasping mechanism. The jaws 116 and 118 have cooperating end portions 120 which are positioned to receive the wire as it is fed through guide tube 56 by the feeding assembly A. A pair of drag links 122 are slotted as at 124 to receive the pivot pin 114. Links 122 are pinned at 126 to a pair of toggle links 128 and 130. The link 128 is secured to upper jaw 116 by pivot pin 132 while the link 130 is secured to lower jaw 118 by the pivot pin 134. A suitable spring 136 extends between pins 132 and 134 for maintaining the toggle linkage in its over center position. A driving member 138 is pinned to the pinion 102 as at 140. Member 138 is pinned to drag links 122 at 142 whereby oscillating motion of member 138 will cause motion of drag links 122 to thereby open and close the jaws 116 and 118 of the wire end grasping mechanism through the toggle linkage 128 and 130. As is evident the entire wire grasping mechanism including drive member 138 is mounted for rotation along with pinion 102. Therefore the grasping mechanism will both rotate and be longitudinally moved as the pinion 102, carried by slide 66, moves along rack 94.

Cam shaft 84 carries a second cam 144 thereon having cam rises 146 along the periphery thereof. A cam follower 148 is carried by an arm 150 secured to a shaft 152, which shaft is suitably mounted in the base 10. The cam follower 148 is positioned to be engaged by the cam rises 146 to effect rotational motion to the shaft 152. The shaft 152 has keyed thereto a pair of arms 154 and 154' having thrust rollers 156 and 156' respectively at the ends thereof. A spring 158 secured to the base 10 and to a pin 160 extending between the arms 154 and 154' biases the said arms into the full line position shown in FIGURE 2. As the cam rises 146 engage the follower 148 shaft 152 will be rotated to thereby move the arms 154 and 154' into the phantom line position shown in FIGURE 2. Movement of the arms from the full line to the phantom line position will effect oscillation of driving member 138 as the member is struck by one of the thrust rollers 156 or 156'. Therefore it can be seen that motion of the arms 154 and 154' control the operation of the wire lead end grasping mechanism.

Figure 4:
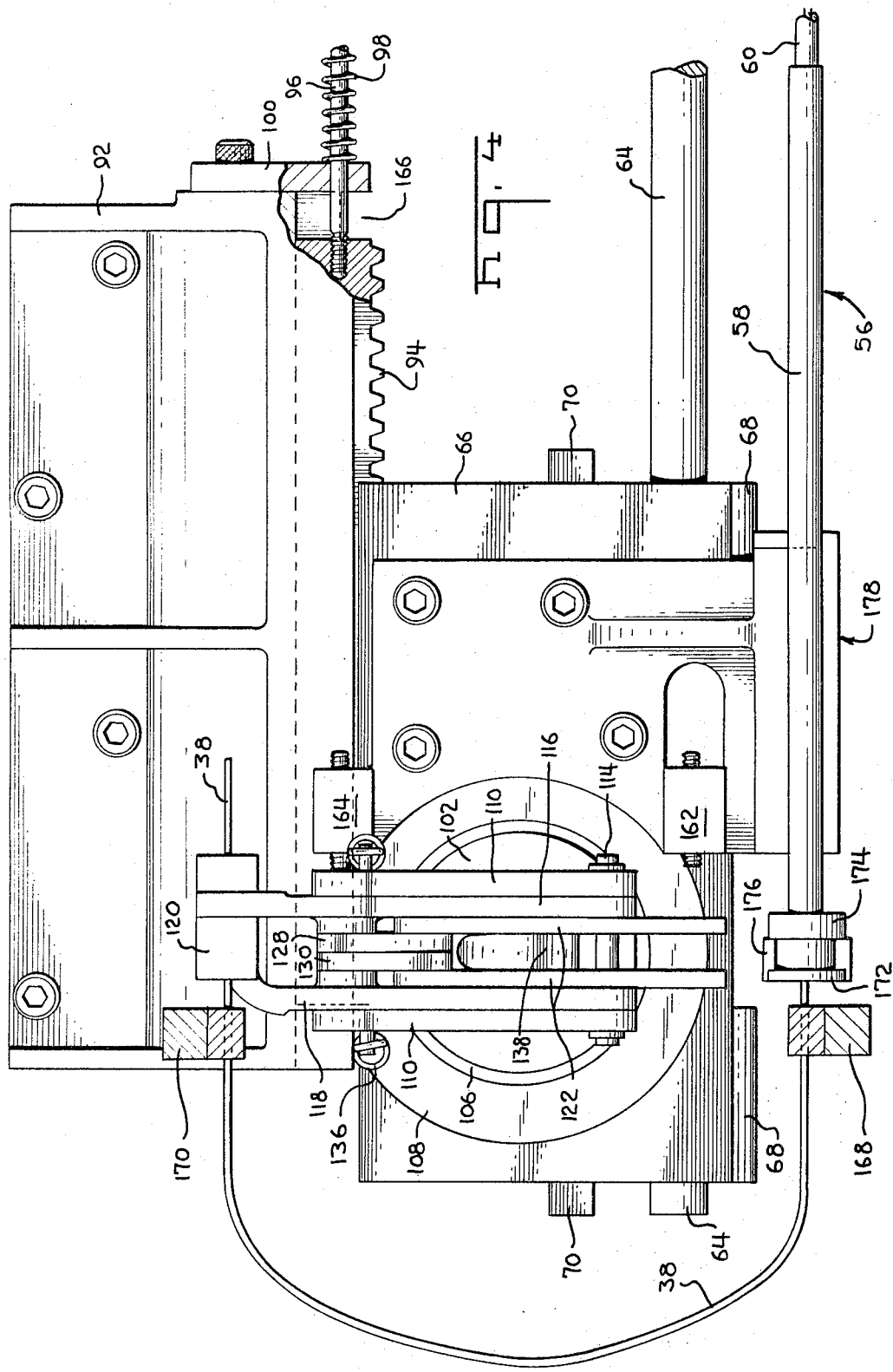
FIGURE 4 is a top plan view similar to FIGURE 3 showing the wire lead end handling means in its wire delivering position.

The wire grasping members 120 will normally be in an open position to receive the wire 38 being fed by feeding assembly A. With the grasping jaws in their open position the drag links 122 will be displaced to the right as seen in FIGURE 2 and the driving member 138 will be displaced clockwise to a position whereby the member is adjacent the roller 156', said roller being in its full line position. As the roller 156' moves to its phantom line position the member 138 will be oscillated counterclockwise into its position shown in FIGURE 2 to effect closing of the jaws 116 and 118 to thereby grasp the wire. As the grasping mechanism is both rotated and translated along with slide 66 and pinion 102 the jaws 116 and 118 along with member 138 will be swung 180 degrees from its position shown in FIGURE 2 and also translated along base 10 away from feeding assembly A. These two positions are shown in FIGURES 3 and 4 wherein FIGURE 3 shows the jaws in their wire receiving position whereas FIGURE 4 shows the jaws after they have been rotated 180 degrees and translated along the base 10 thereby imparting a looped configuration to the wire 38. With the jaws in the position shown in FIGURE 4 the driving member 138 will be in a position adjacent roller 156 in its full line position shown in FIGURE 2. It is noted that the arms 154 and 154' are displaced along shaft 152 a distance equal to the amount of translatory motion imparted to the member 138. With the member 138 now adjacent roller 156 the roller will be driven clockwise as seen in FIGURE 2 to thereby impart motion to member 138 which motion will now open the jaws 116 and 118 to release the wire held therebetween.

A pair of stops 162 and 164 are carried by slide 66, the stops being positioned to engage opposite sides of the U-shaped member 110 to thereby limit rotation of pinion 102 to 180 degrees. With reference to FIGURES 3 and 4 as slide 66 is moved leftwardly from its position shown in FIGURE 3 to its position of FIGURE 4 it can be seen that rotation of pinion 102 will cause the U-shaped member 110 to swing 180 degrees until the member contacts the stop 164. During this rotation the rack 94 which meshes with pinion 102 has been held stationary in the bracket 92 fixed to the base 10. When member 110 contacts stop 164 the pinion 102 is prevented from further rotation. However, the slide 66 has not reached the limit of its travel when this condition occurs. Therefore since the slide is still moving to the left and the pinion 102 cannot turn, the rack 94 is forced to move as a unit with the pinion and this movement is permitted by the compression of the spring 98 previously described. The gap 166 shown in FIGURE 4 represents the amount of movement that rack 94 undergoes relative to the bracket 92 during the end portion of the movement of the slide. This slight movement of rack 94 is necessitated by the relative position of the various parts shown in FIGURE 4. A pair of gripping jaws 168 and 170 carried by the conveyor C (FIGURE 1) are shown in FIGURE 4 in their relative positions with regard to the lead end handling and turning assembly B. It can be seen from FIGURE 4 that the wire gripping mechanism of the instant invention would interfere with jaws 170 of the conveyor if the mechanism were rotated directly into its final position shown in FIGURE 4. Therefore the mechanism is permitted to rotate to its final position prior to moving adjacent to jaws 170 and thereafter the mechanism is translated along a straight line path until the gripping portions 120 of the jaws 116 and 118 move closely adjacent to the conveyor jaws 170.

Figure 7:
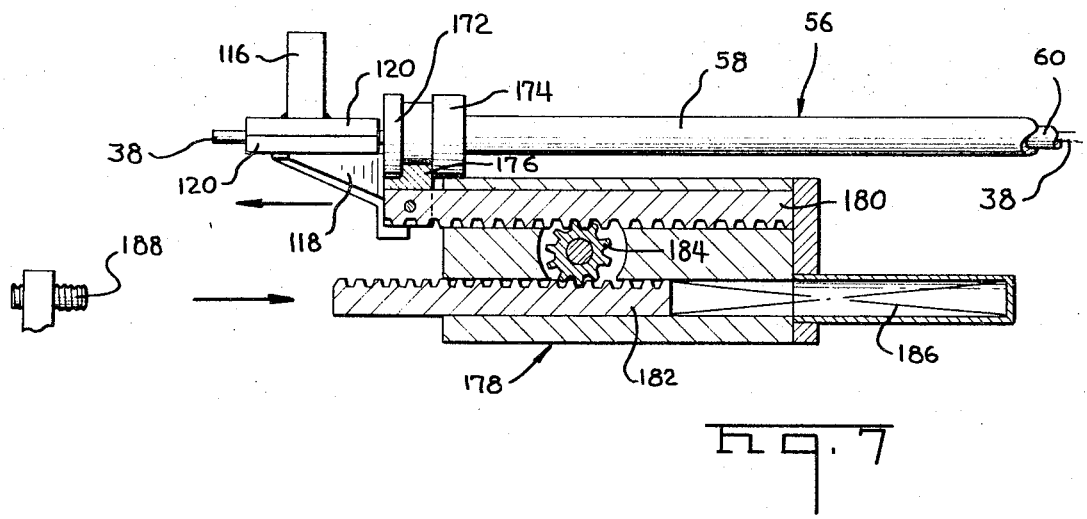
FIGURE 7 is a view partly in section taken along the line 7—7 of FIGURE 2.

Provision must also be made for moving the guide tube 56 closely adjacent to conveyor jaws 168. With reference to FIGURE 7 the outer portions 58 of guide tube 56 is provided with a pair of rings 172 and 174 at the exit end of the tube which rings are located on opposite sides of a block 176 to thereby secure the end of tube 56 to the block. A rack assembly 178 is carried by slide 66 and comprises a pair of racks 180 and 182 in mesh with an intermediate pinion 184 disposed therebetween. The block 176 is secured to rack 180 and is carried thereby. A suitable spring 186 is carried by the rack assembly and normally biases the rack 182 to a leftward position as shown in FIGURE 7. The rack assembly 178 moves along with slide 66 with the various parts in their normal position shown in FIGURE 7. As the slide 66 moves leftwardly as seen in FIGURE 7 the rack 182 will contact a stop member 188 thereby preventing further leftward motion of the rack. Continued leftward movement of rack assembly 178 causes compression of spring 186 and rotation of pinion 184. Rotation of the pinion causes the rack 180 to move leftward at a greater rate than the movement of rack assembly 178 and this additional movement of the rack 180 causes the outer portion 58 of the guide tube 56 to move further than the slide 66 into a position closely adjacent the conveyor jaw 168 as seen in FIGURE 4.

Turning now to FIGURES 1 and 6 the cutoff assembly D will now be described in detail. A cutter frame 190 is suitably secured to base 10 and carries a pair of gibs 192. A slide member 194 is mounted for reciprocatory movement within the guide channel formed by the gibs 192. The slide 194 is provided with a pair of spring housings 196 having springs 198 mounted therein. A piston-like member 200 is disposed within slide 194 and has oppositely directed abutment shoulders 202 and 204 for engaging opposite sides of the spring housing 196 to thereby limit the movement of piston 200 relative to slide 194. The springs 198 contact the piston 200 to normally hold the piston and slide in their relative positions shown in FIGURE 6. A connecting rod 206 is pinned to the piston 200 for imparting motion to the piston. The rod 206 is reciprocated by suitable driving means not shown such as a cam and cam follower arrangement and the piston 200 is normally biased to a retracted or leftward position as seen in FIGURE 6 by a spring 208 (FIGURE 1). The piston 200 is connected at its end to a pair of toggle links 210 which are pinned to a pair of oscillating cutting arms 212 having cutting blades 214 mounted therein. The blades 214 cooperate with a scissors-like action to sever the feed wire.

The cutting assembly is normally in a retracted position such as shown in FIGURE 6 in which position the blades 214 do not intersect the stock feed path. When the stock or wire must be severed the connecting rod 206 is actuated to thereby move piston 200 to the right (FIGURE 6) thereby moving the cutter slide 194 to the right. The springs 198 are sufficiently stiff that the piston 200 and slide 194 will move as a unit. When the slide 194 has moved to the right a sufficient distance to properly position the cutting blades relative to the wire a shoulder 216 on spring housing 196 will contact a pin 218 fixed to the stationary cutter frame 190. Engagement of shoulder 216 and pin 218 will prevent further rightward movement of slide 194. However, piston 200 will continue to move to the right thus compressing springs 198. This additional movement of the piston causes spreading of the toggle links 210 to thus close blades 214 with a shearing action. The blades 214 will oscillate about pivot pins 220 which are fixed to the slide 194.

A complete cycle of operation of the apparatus and method of the present invention will now be described. It will be understood that a suitable control circuit will be provided for controlling the actuation of feed motor 24, cam shaft 84, movement of rod 206, and movement of the conveyor C so that the various parts are properly synchronized, such control circuit taking the form of any one of a number of arrangements which can readily be determined by one skilled in the art. At the beginning of a cycle the conveyor C, which may be the conveyor shown in the Andren patent, will be stopped with the pair of jaws 168 and 170 in their open wire-receiving position. The cutter assembly D will be in its retracted position and the wire 38 will extend through the feed assembly and through the guide tube 56 and will end at a point opposite the cutting blades as shown in FIGURE 3. The lead end assembly will be in its position shown in FIGURE 3 with the jaws 116 and 118 being in their open wire-receiving positions. As the cycle starts the jaws 116 and 118 will close to firmly grasp the wire therebetween and the motor 24 will be energized to begin rotation of the feeding wheels 12. The wire will begin to be fed by the wheels 12 and concurrently therewith cam 86 will cause movement of connecting rod 82 to thus swing pinion sector 74 thus causing movement of the main slide 66 of the lead end handling assembly. As slide 66 moves to the left in FIGURE 1 the pinion 102 will be rotated by rack 94 thus causing rotation of the gripping jaws 116 and 118. This rotation of the jaws will cause the lead end of the wire to pass first between the jaws 168 on the conveyor C and subsequently the lead end will be turned 180 degrees until the U-shaped member 110 surrounding the jaws 116 and 118 contacts stop 164. At this point rotation of the jaws 116 and 118 will stop and the rack 94 will be displaced slightly to the left to its position shown in FIGURE 4 thus allowing the jaws 116 and 118 to move closely adjacent to the conveyor jaw 170. Meanwhile the rack 182 of the rack assembly 178 will contact stop 188 thus causing accelerated movement of rack 180 to thereby move the guide tube 56 into a position closely adjacent conveyor jaw 168, thus assuring that the wire will properly be located between the open jaws on the conveyor. The conveyor jaw 170 will close and the wire will be continually fed out thus increasing the length between the jaws 168 and 170 until the proper predetermined length of wire has been fed, this being determined by the measuring wheel 42 and the counting wheel 44. When the proper count has been reached motor 24 will be quickly stopped by a suitable breaking mechanism and conveyor jaw 168 will close to thereby secure both ends of the wire lead. Pinion sector 74 will then rotate in the opposite direction to thus restore the main slide 66 and its associated parts to their starting position, at which time connecting rod 206 will be actuated to bring the cutter slide into its position and thereafter the cutting blades 214 will close to sever the wire lead thus leaving the predetermined length of wire suspended between the conveyor jaws 168 and 170. In FIGURE 1 there is shown a wire lead 38' held between conveyor jaws 168' and 170', the lead 38' being loaded onto the conveyor in the preceding cycle. From the disposition of lead 38' it is obvious that any subsequent machinery such as stripping mechanisms or crimping presses or the like can all be disposed on the same side of the conveyor C and can operate on both ends of the lead 38' at one time. The length of the lead 38' can be easily controlled merely by the proper setting of the counter actuated by the counting wheel 44. With the cycle completed the spring 208 will retract the cutter assembly to its starting position. The opening and closing of the jaws 116 and 118 was described previously and the sequence is such that the jaws will close upon starting of feeding motion of the wire and the jaws will open after the wire end has been turned 180 degrees and positioned within the carrier jaw 170 and secured therein.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

What is claimed is:

1. In a conveyor for stock material such as wire which is supplied from a substantially endless source, said conveyor being of the type having a plurality of pairs of stock grippers thereon, the improvement comprising: means for feeding stock from said source on one side of said conveyor along a stock feed path extending transversely of said conveyor and past one stock gripper of a pair of said stock grippers to the other side of said conveyor, means for turning the leading end of said stock on the other side of said conveyor and locating said leading end in the other stock gripper of said one pair of stock grippers, means on said one side of said conveyor for cutting said stock at a location adjacent to said one stock gripper, and means for coordinating the functioning of said conveyor, said stock feeding means, said stock cutting means and said leading and turning means to effect feeding of said leading end of said stock past said one stock gripper, turning of said leading end and locating said leading end in said other stock gripper, feeding of a predetermined length of stock from said source, and cutting of said stock at said location, whereby said pair of stock grippers is loaded with a predetermined length of said stock, each end of said length being held in one of said gripping devices of said pair with said ends directed towards said one side of said conveyor.

2. A lead making machine comprising a conveyor having a plurality of cooperable pairs of wire gripping devices thereon, means on one side of said conveyor for feeding wire from a substantially endless source along a path extending transversely of said conveyor to the other side of said conveyor and through one of a pair of said wire gripping devices, means on said one side of said conveyor for cutting wire between said one gripping device and said source and adjacent to said one gripping device, means for turning the leading end of said wire on said other side of said conveyor and locating the turned wire end in the other one of said pair of said gripping devices, said other gripping device being disposed adjacent to and beside said path of wire feed, and means for coordinating the functioning of said wire feeding means, said wire end handling means, and said wire cutting means, whereby the leading end of said wire is fed through said one gripping device and said leading end is turned on said other side of said conveyor and located in said other gripping device by said wire end handling means and additional wire is fed from said source to said other side and said wire is cut after feeding by said cutting means, said pair of gripping devices holding the ends of a lead after cutting with said ends facing laterally of said conveyor in the same direction.

3. In a conveyor for stock material such as wire which is supplied from a substantially endless source, said conveyor being of the type having a plurality of pairs of stock grippers therein, the improvement comprising means for feeding stock from said source along a path in alignment with a first one of said pair of stock grippers, means for measuring the amount of material fed by said feed means, lead end grasping means for grasping the lead end of the stock fed by said feed means, guide means extending between said feed means and said lead end grasping means, said lead end grasping means comprising a slide member movable toward and away from said feed means, a rotating member mounted on said slide member, a pair of gripping jaws mounted on said rotating member, said jaws being rotatable for 180 degrees, the said jaws when in their extreme rotated positions being in alignment with either one of said pair of stock grippers on said conveyor, means for severing said stock material between said first one of said pair of stock grippers and said elongated guide means, whereby a length of material fed by said feed means will be carried by said lead end grasping means and positioned to extend through both grippers of a pair of grippers on said conveyor, and said severing means will sever said length of material to provide for said length to be held between said pair of stock grippers with the ends of said length of material both facing in the same direction.

4. Material handling apparatus comprising means to feed a length of material from a substantially endless source in a first direction, means to grasp the lead end of said material and to turn said lead end generally 180 degrees, and means to sever said material at the end of said length of material, whereby said length of material has a generally U-shaped configuration with the ends thereof both facing in a second direction which is opposite to said first direction.

5. Material handling apparatus as set forth in claim 4 further comprising a pair of jaws movable along a path at generally right angles to said feed direction, said jaws serving to hold said length of material in its U-shaped configuration.

6. Material handling apparatus as set forth in claim 4 wherein said feed means comprises a pair of oppositely driven feed wheels, and an idling wheel adapted to be engaged by the driven material for measuring the amount of fed material.

7. Material handling apparatus as set forth in claim 4 wherein said lead end grasping means comprises a slide member mounted for movement in the direction of material feed, a turntable mounted on said slide member for sliding movement therewith and rotational movement relative thereto, a pair of gripping jaws mounted on said turntable, said jaws being operative to grasp the lead end of the fed wire and to rotate said wire during forward movement of said slide member, and means for opening and closing said jaws.

8. Material handling apparatus as set forth in claim 4 wherein said severing means comprises a slide member, a pair of cooperable cutting blades pivotally mounted on said slide member, said slide member serving to position said cutting blades along the path of stock travel, means for moving said slide member to its cutting position, said last named means being operable to effect severing motion of said cutting blades subsequent to the completion of movement of said cutter slide.

9. Material handling apparatus as set forth in claim 4 further comprising an elongated guide tube having telescoping parts, one said part being secured to said feed means and the other said part being secured to said lead end grasping means, and means to effect movement of said lead end grasping means away from said feeding means.

10. A method of loading a predetermined length of wire into a pair of jaws of a movable conveyor comprising the steps of feeding wire from a substantially endless source along a path extending transversely of said conveyor and aligned with one jaw of said pair of jaws, grasping the leading end of said wire and turning said leading end approximately 180 degrees to position said leading end in the other of said pair of jaws, closing said pair of jaws with the wire positioned therein, and severing said wire between said one jaw and said source, whereby said predetermined length of wire is secured within the jaws of said conveyor with the ends of said wire extending in the same direction.

11. A method of handling stock material comprising the steps of feeding a predetermined length of said material along a given path in a first direction, turning the leading end of said material 180 degrees to place said material in a U-shaped configuration, grasping the ends of said length of material, and severing said length of material from the material supply whereby the U-shaped length of material is held with the ends thereof facing in a second direction which is opposite to said first direction.

References Cited
UNITED STATES PATENTS

| | | | |
|---|---|---|---|
| 2,715,941 | 8/1955 | Rankin et al. | 83—176 |
| 3,244,343 | 4/1966 | Martin | 83—176 X |

WILLIAM S. LAWSON, *Primary Examiner.*